United States Patent [19]

Kinoshita et al.

[11] Patent Number: 5,444,933
[45] Date of Patent: Aug. 29, 1995

[54] TRAWL FISHING GEAR AND TRAWL FISHING METHOD

[76] Inventors: Hiromi Kinoshita, 6-2, Ohtemachi 2-chome, Chiyoda-ku, Tokyo; Yoshiki Matsushita, Bow Urayasu 208, 14-29, Fujimi 3-chome, Urayasu-shi, Chiba; Yoshihiro Inoue, 18-5, Higashinakano 4-chome, Nakano-ku, Tokyo, all of Japan; Zykin V. Ignatyevich, Pacific Department of Perspective Scientific Fishering Research (TURNIF) 2, 1st May Street, Vladivostok, 690019,

[21] Appl. No.: 975,911

[22] Filed: Nov. 10, 1992

[30] Foreign Application Priority Data

Nov. 12, 1991 [JP] Japan .................. 3-295969

[51] Int. Cl.⁶ ............................ A01K 73/02
[52] U.S. Cl. ................................. 43/9.7
[58] Field of Search .............. 43/4.5, 9.7, 43.13

[56] References Cited

U.S. PATENT DOCUMENTS 5,201,137  4/1993  Theret et al. ............. 43/9.7

FOREIGN PATENT DOCUMENTS

| 672603 | 10/1963 | Canada | 43/9.7 |
| 680845 | 5/1930 | France | 43/9.7 |
| 0224200 | 7/1985 | Germany | 43/9.7 |
| 69638 | 6/1930 | Sweden | 43/9.7 |
| 0568423 | 8/1977 | U.S.S.R. | 43/9.7 |
| 1138089 | 2/1985 | U.S.S.R. | 43/9.7 |
| 1248581 | 8/1986 | U.S.S.R. | 43/9.7 |
| 1667784 | 8/1991 | U.S.S.R. | 43/9.7 |

*Primary Examiner*—Kurt Rowan

[57] ABSTRACT

Trawl fishing gear characterized by providing net-mouth expanding bodies at respective predetermined positions near or upstream of upstream ends of respective wing portions of the trawl net. This adjusts the angle and/or surface area of the net-mouth expanding bodies. By connecting respective lifting ropes to the net-mouth expanding bodies which inturn apply pulling forces to variable action points for varying the angle and surface area against water flow.

11 Claims, 12 Drawing Sheets

TRAWL FISHING GEAR AND TRAWL FISHING METHOD

BACKGROUND OF INVENTION

This invention relates to a trawl fishing gear which allows for freely adjusting on board the opening of net-mouth and a trawl fishing method using said trawl fishing gear.

PRIOR ART

In general, expanding of net-mouth is carried out by means of otter boards of large weight having a fixed form. More specifically, the front ends of left and right warps have respectively otter boards attached thereto, and respective left and right wing portions of net-mouth are connected to said otter boards through otter-pendant and hand-rope with net-pendant. For adjusting net-mouth expanding width, it is necessary to vary the angle of attack of otter boards against water body thereby to control the water force applied to the otter boards, so that the trawl fishing gear is to be lifted on board and readjust the attaching positions of otter board pendants for that purpose.

However, the heretofore known methods for adjusting the expanding width of net-mouth through otter boards suffer from the following disadvantages:

First, even the increase or decrease of the speed of trawler for the purpose of varying the net-mouth expanding width causes little variation in the angle of attack of otter boards and the force of water body applied to otter boards. The variation of net-mouth expanding width to the desired extent has been very difficult.

Secondly, in the case when the trawl net is towed while researching the fish group, the little variation of net-mouth expanding width causes no variation of the resistance of trawl fishing gear, so the economy of fuel has been also difficult.

Thirdly, if the trawl fishing gear is pulled up on board for the purpose of fuel economy and vast searching operation, a considerable time is required for setting the trawl fishing gear again when finding any fish group, the sight of which is lost or which is caught by other trawlers.

Fourthly, since the otter boards have generally large size and weight, the handling thereof on board is very difficult and needs the experienced persons when the otter boards are lifted on board for adjusting their net-mouth expanding width.

SUMMARY OF THE INVENTION

Accordingly, it is the object of the invention to provide a novel and easy to handle type of trawl fishing gear and a trawl fishing method using said gear, which allow for freely adjusting on board the net-mouth expanding force, suitably adjusting the net-mouth expanding width corresponding to the fishing purposes thereby to decrease the fuel cost of trawler.

Said object is achieved in accordance with this invention in that the trawl fishing gear according to the invention is characterized by providing net-mouth expanding bodies at respective predetermined positions near or upstream of upstream ends of respective wing portions of trawl net so as to adjust the angle and/or surface area of said net-mouth expanding bodies, and by connecting respective lifting rope to said net-mouth expanding bodies so as to apply pulling forces to variable action points thereon for varying the angle and surface area thereof against water flow.

Further, in the trawl-fishing method according to the invention consisting of towing a trawl fishing gear provided with net-mouth expanding bodies located at respective predetermined positions near or upstream of upstream ends of respective wing portions of trawl net so as to adjust the angle and/or surface area of said net-mouth expanding bodies, and with respective lifting rope connected to said net-mouth expanding bodies so as to apply pulling forces to variable action points thereon for varying the angle and surface area thereof agianst water flow, the reeling-off length of said lifting rope is adjusted for varying the angle and surface area of respective net-mouth expanding bodies thereby to regulate the opening of net-mouth of said trawl net.

According to the invention, the reeling-off length of said lifting rope is adjusted for regulating the tension force applied on the variable action points of respective net-mouth expanding bodies in accordance with the trawl fishing so as to vary the angle and surface area thereof against water flow to vary current force applied on the internal surfaces of said bodies and readjust the net-mouth expanding width of net-mouth.

Since the trawl fishing gear and the trawl-fishing method according to the invention have the construction and effects as described above, the net-mouth expanding force can be freely readjusted by regulating the reeled our length of lifting rope on board thereby to adjust the net-mouth expanding width of net-mouth according to the fishing purposes, so that the flow resistance can be largely decreased by closing net-mouth of trawl net in the case of high speed shift of trawler, with decrease fuel cost and easy handling of trawl fishing gear.

BRIEF DESCRIPTION OF THE DRAWINGS

For a better understanding of the present invention, reference is made to the following detailed descriptions, taken in conjunction with the accompanying drawings, in which.

DETAILED DESCRIPTIONS OF EXEMPLARY EMBODIMENTS

With reference to FIG. 1 to 5, there is illustrated the first embodiment of trawl fishing gear according to the invention which is applied to the bottom fishing trawl net.

Figure 1:
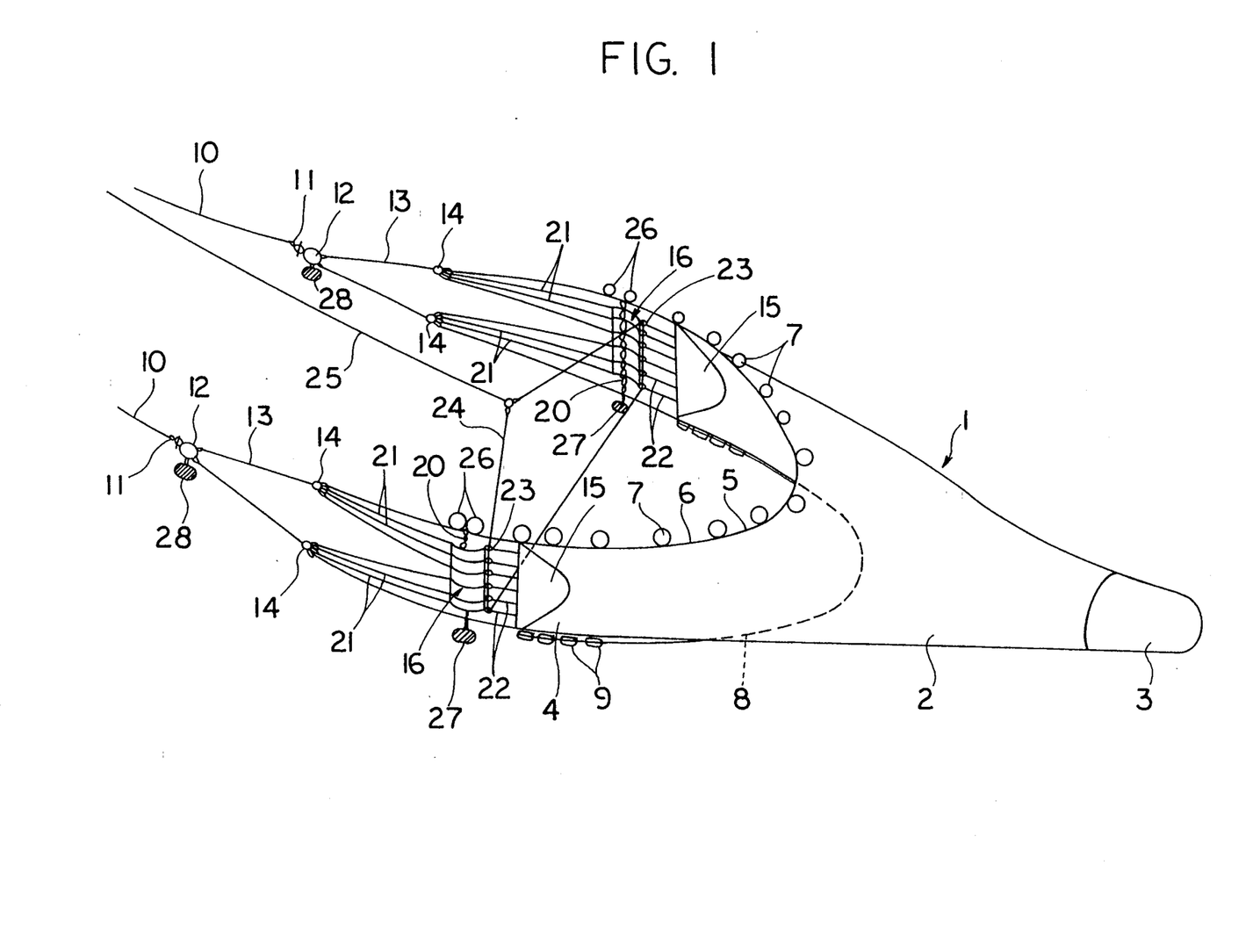
FIG. 1 is a perspetive view of the first embodiment of trawl fishing gear according to the invention.
Figure 2:
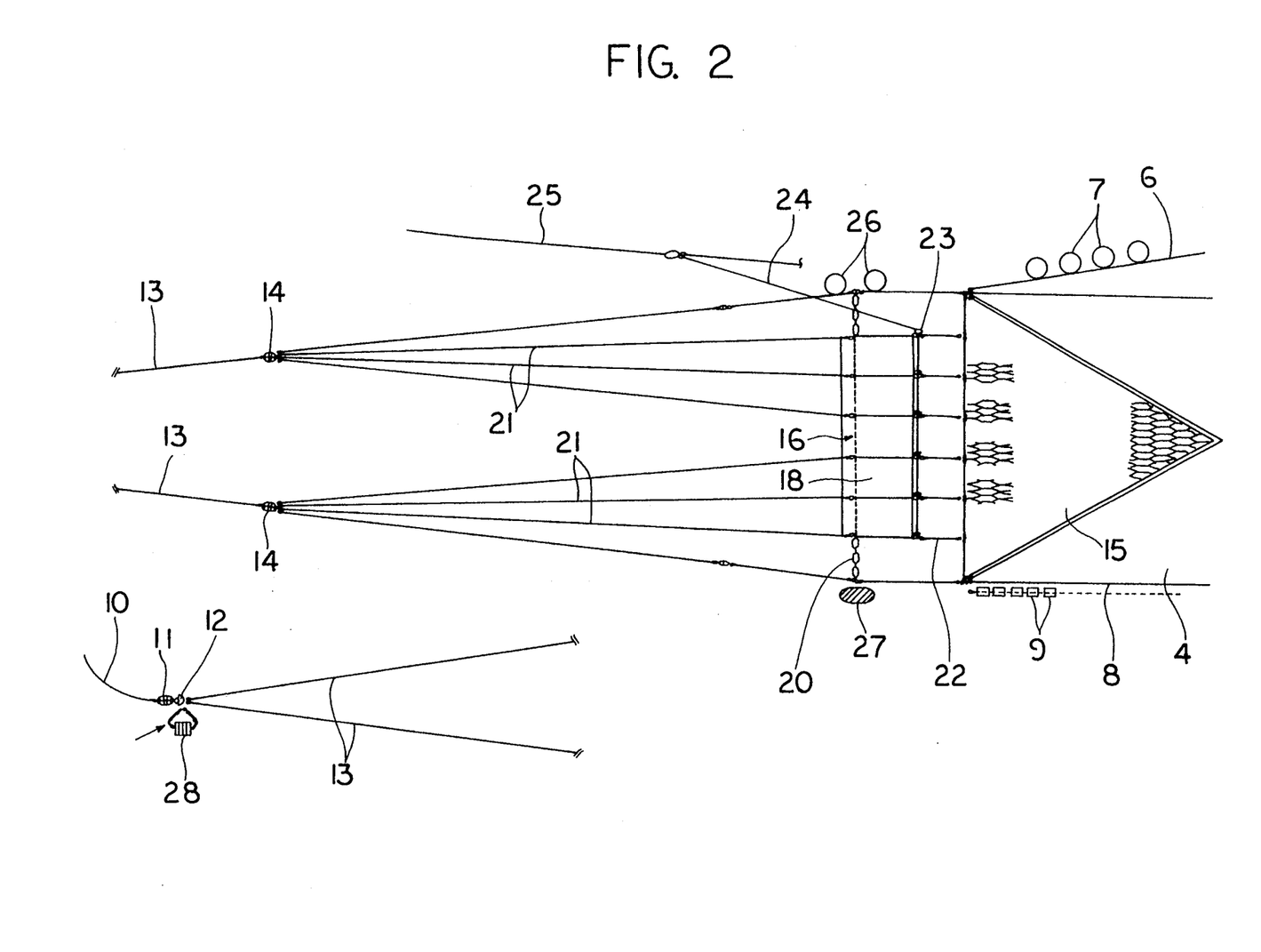
FIG. 2 is an enlarged view of the essential portion of the trawl fishing gear shown in FIG. 1.

In FIG. 1 and FIG. 2 which show the entire construction of the trawl net, there is shown the trawl net 1 for bottom fishing use, which consists of net-body 2 and cod end 3. Respective wings 4 are connected to the front portions of either side of said net-body 2. A head rope 6 forming the upper edge of net-mouth 5 of net-body 2 has a number of floats 7, 7 attached thereto, while ground rope 8 forming the lower edge of net-mouth 5 has a number of ground bobbins 9 attached thereto. In this embodiment which does not use the well known otter boards, the front end of warps 10, 10 reeled out from on board has each a tough-warp combining member 12 attached thereto through respective swivels 11 with bearing. Said tough-warp combining member 12 and the upper and lower edges of the upstream end portion of respective wings 4 are connected with each other by tough-rope 13, 13, respectively. Swivels 14 are fitted in the middle portion of respective tough-ropes 13, 13.

Figure 3:
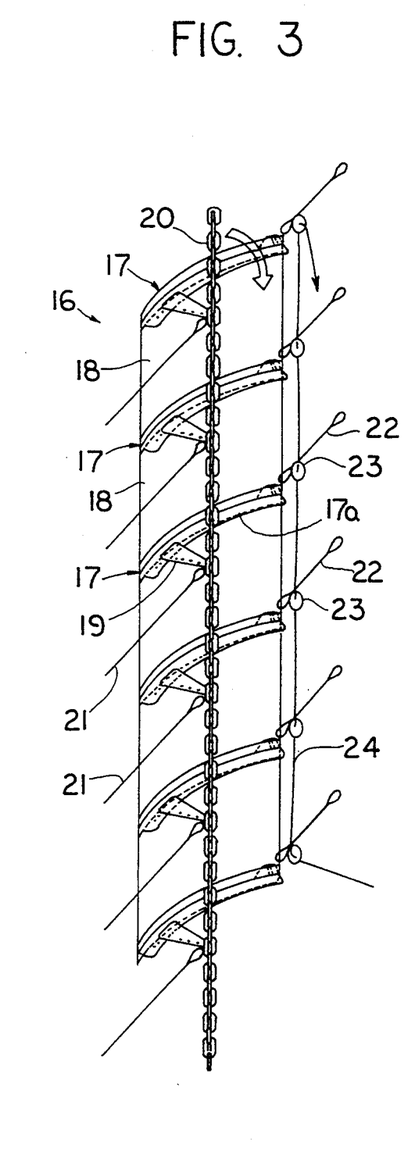
FIG. 3 is a perspetive view of the net-mouth expanding body used in the embodiment shown in FIG. 1 and FIG. 2.
Figure 4:
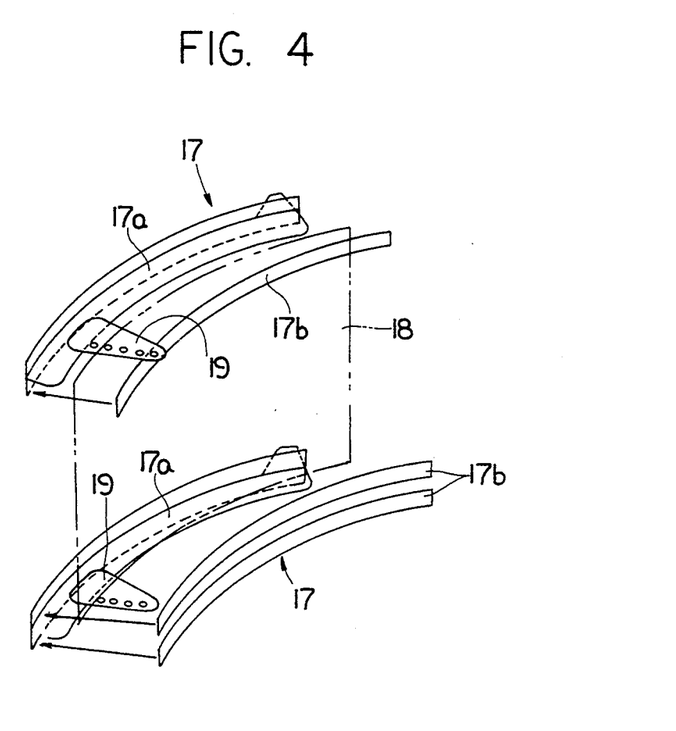
FIG. 4 is an enlarged perspective view of a portion of net-mouth expanding body shown FIG. 3.
Figure 5:
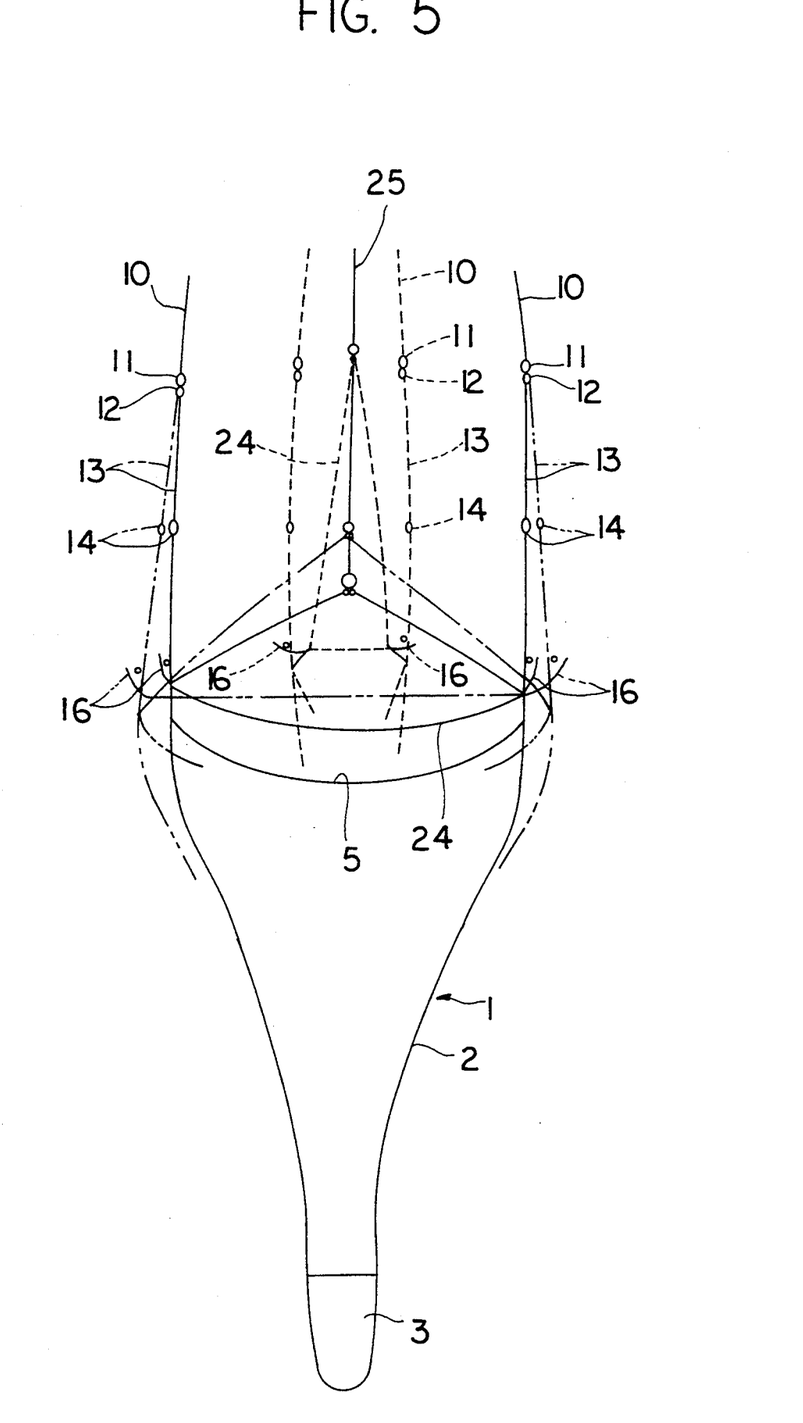
FIG. 5 is a plan view showing the trawl fishing gear of FIG. 1 in its using state.
Figure 6:
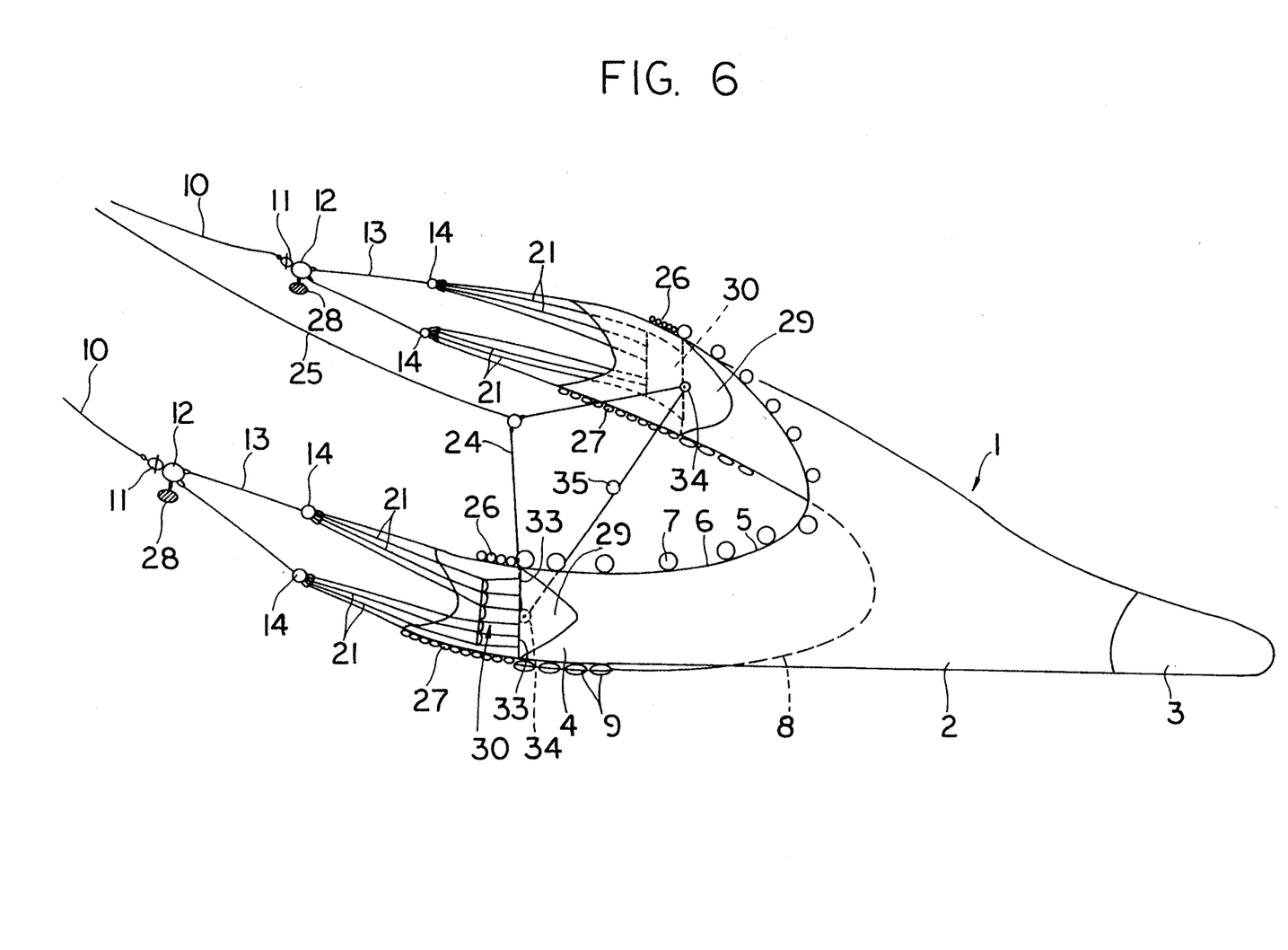
FIG. 6 is a perspective view of the second embodiment of trawl fishing gear according to the invention.
Figure 7:
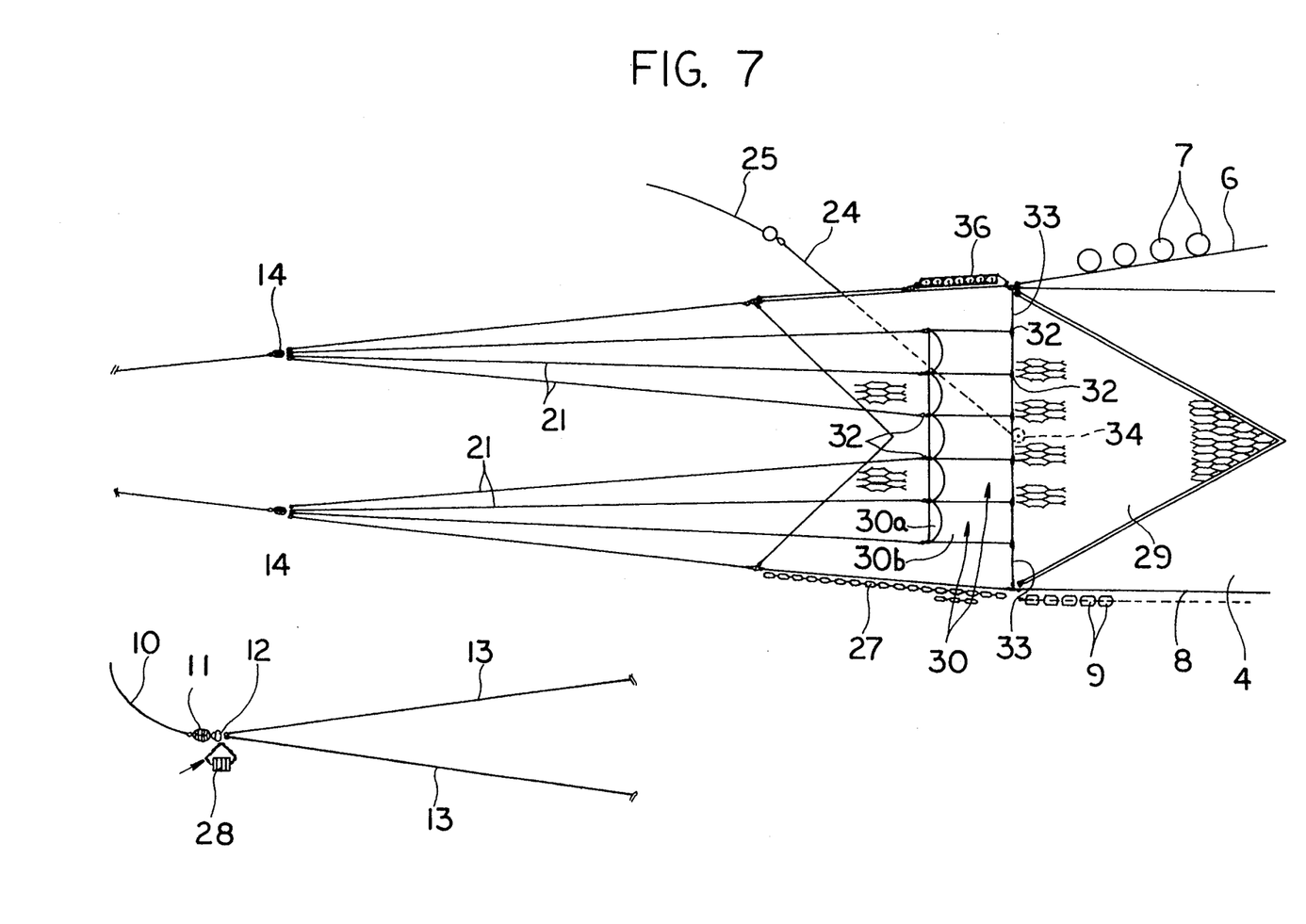
FIG. 7 is an enlarged view of the essential portion of the trawl fishing gear shown in FIG. 6.

In this embodiment of trawl net 1 formed as above, substantially triangle floating net 15 similar to rope-net with large mesh size are connected to leading edges of respective wings 4. Net-mouth expanding bodies 16 as shown in FIG. 3 are fixed respectively between the upstream ends of said floating nets 15 and respective swivels 14, 14 fitted in respective tough-warp 13, 13 near the tough-warp combining members 12. Said net-mouth expanding bodies 16 consist respectively of kites 18, 18 . . . formed with substantially rectangular canvas and the like materials and extended between metallic bent frames 17, 17 as shown in FIG. 4. The vertical length of each kite 18 corresponds to approximately 1/7 of the length of forward edge of corresponding floating net 15. The upper and lower edges of each kite 18 are cramped by means of body portion 17a and cramping member 17b of respective bent frame 17. Substantially triangle brackets 19 are fixed on the upstream inner surface of respective frame body 17a of bent frame 17. A chain 20 having length substantially equal to the upstream edge of floating net 15 is provided between upper and lower tough-warp 13, 13, and the top ends of said brackets 19 are rotatably attached to the chain 20 thereby to fix the net-mouth expanding body 16. The upper and lower respective three tops of the brackets 19 are connected to corresponding swivels 14 of tough-warp 13 by means of connecting wires 21. Downstream ends of frame body 17a of respective bent frames 17 and the each seventh portions of upstream edge of floating net 15 are connected with each other by means of six connecting wires 22. Rings 23, which serve as variable action points of net-mouth expanding body 16, are formed respectively at the upstream ends of said connecting wires 22. A tightening rope 24 is inserted successively through these rings 23. The both downstream ends of the tightening rope 24 are combined by a lifting rope 25. Angle and surface area of net-mouth expanding body 16 aganst water flow are adjusted corresponding to the reeled-out length of said lifting rope 25. Where upper and lower tough-warps 13, 13 are connected to chain 20, floats 26 and weight 27 are connected respectively for the purpose of stretching said kites 18. Weights 28 can be attached to the tough-warp combining member 12, if necessary. Further, swivels or snap rings and the other known connecting members can be fitted in the connection points of various components or in the halfway portion thereof.

The operation of this embodiment will be described herein below:

When the trawl net 1 is set from on board, the cod end 3 thereof and other components are successively laid out. Since the structure of this embodiment has no cumbersome otter board of large weight, the operation is very safe and easy.

When trawl net 1 has been laid out into water, respective kites 18 of net-mouth expanding bodies 16 are normally stretched in vertical direction due to the action of floats 26 and weights 27 as shown in FIG. 3. Each net-mouth expanding body 16 is fitted to trawl net 1 in its upstream opening state against water flow corresponding to the positions of bracket 19 and connection wires 21, 22 connected to bent frames 17. At the beginning steps of laying out of trawl net 1, the lifting rope 25 is sufficiently reeled out so as not to apply the pulling force of lifting rope 25 onto rings 23 as shown by the continuous line in FIG. 5. In this state, each net-mouth expanding body 16 is subject to the action of water flow, and the outer component caused thereby in respective net-mouth mouth expanding body 16 separates from each other these net-mouth expanding bodies 16 on both sides and corresponding side portions of trawl net 1, i.e. wings 4, 4 connected thereto, so that net-mouth 5 of trawl net 1 is expanded until it reaches a balanced state in response to the net-mouth expanding forces of respective net-mouth expanding bodies 16.

Readjustment of the opening of net-mouth 5 can be carried out very easily by regulating the reeled out length of lifting rope 25 on board.

More specifically, when lifting rope 25 is wound up by means of lifting winch on board, thereby to apply upstream pulling force to respective rings 23 by means of tightening rope 24 as shown by thick arrow in FIG. 3, respective net-mouth expanding bodies 16 are caused to rotate its rearward end into the inner side about the axis of connection points of respective brackets 19 to chain 20, thereby to vary the angle and the surface area of net-mouth expanding body 16 against water flow. The angle of net-mouth expanding body 16 at which the net-mouth expanding force attains maximum value is determined corresponding to the fixing position of bracket 19 to bent frame 17 and that of connecting wire 21 of upstream side of bracket 19. Accordingly, by regulating the reeled out length of lifting rope 25 so as to vary in a adjustable manner the angle of net-mouth expanding bodies 16 from the initial angle shown by continuous line of FIG. 5 up to the angle corresponding to the maximum net-mouth expanding force shown by chain line of the same figure, the opening of net-mouth 5 of trawl net 1 can be freely readjusted. In this case, since pulling force is applied to net-mouth expanding bodies through respective tightening ropes 24 branching in fork manner from the doawnstream end of lifting rope 25, equal opening regulating forces are applied to respective net-mouth expanding body 16, so that both wings 4, 4 on both sides are opened or closed symmetrically with respect to the advancing direction without any change from the predetermined advancing direction of trawl net 1.

In the case of searching any fish groups or of shifting of trawler at high speed to the area where fish groups have been detected, lifting rope 25 is further wound up thereby to rotate respective net-mouth expanding body 16 over said angle corresponding to the maximum net-mouth expanding force, thereby to make the inner surface of respective net-mouth expanding body 16 to be located vertical to water flow. In this state, the net-mouth expanding force of respective net-mouth expanding body 16 becomes zero, so that net-mouth 5 of trawl net 1 is gradually closed. When further winding up the lifting rope 25 up to reverse the downstream end and the upstream end of net-mouth 5 thereby to cause the force applied to net-mouth expanding body 16 to act in the closing direction of net-mouth 5 of trawl net 1, then net-mouth 5 is closed. When the net-mouth 5 has been closed, resistance of trawl net 1 against water flow becomes minimum. Towing of trawl net 1 at the minimum resistance against water flow allows for a shift of trawler at high speed with decrease fuel cost.

Lifting operation of trawl net 1 up to on board can be carried out very easily with steps reverse to those of laying out operation.

The second embodiment of the invention shown in FIG. 6 to FIG. 12 is applied to a trawl net 1 for bottom fishing. The same parts as those of the first embodiment are designated by the same numbers.

The trawl net according to this embodiment is constructed so as to adjust the angle and surface area of kites, thereby vary the opening of net-mouth 5 of trawl net 1, in the same manner as in the first embodiment.

Figure 8:
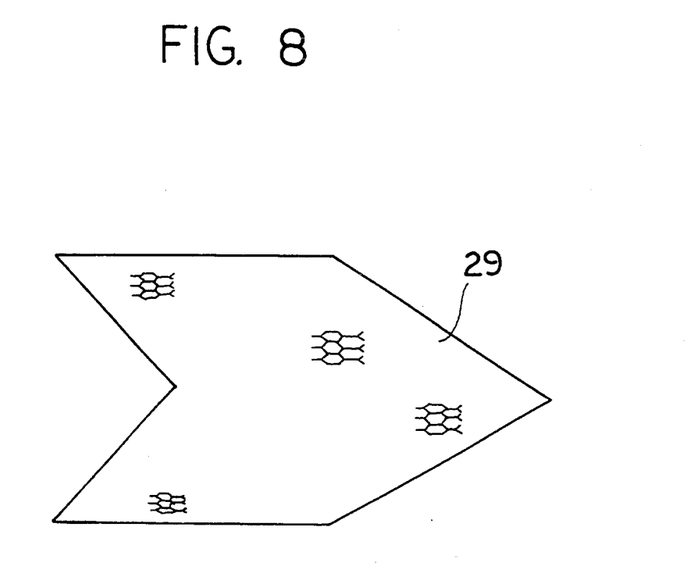
FIG. 8 is a plan view of floating net used in the trawl fishing gear shown in FIG. 7.
Figure 9:
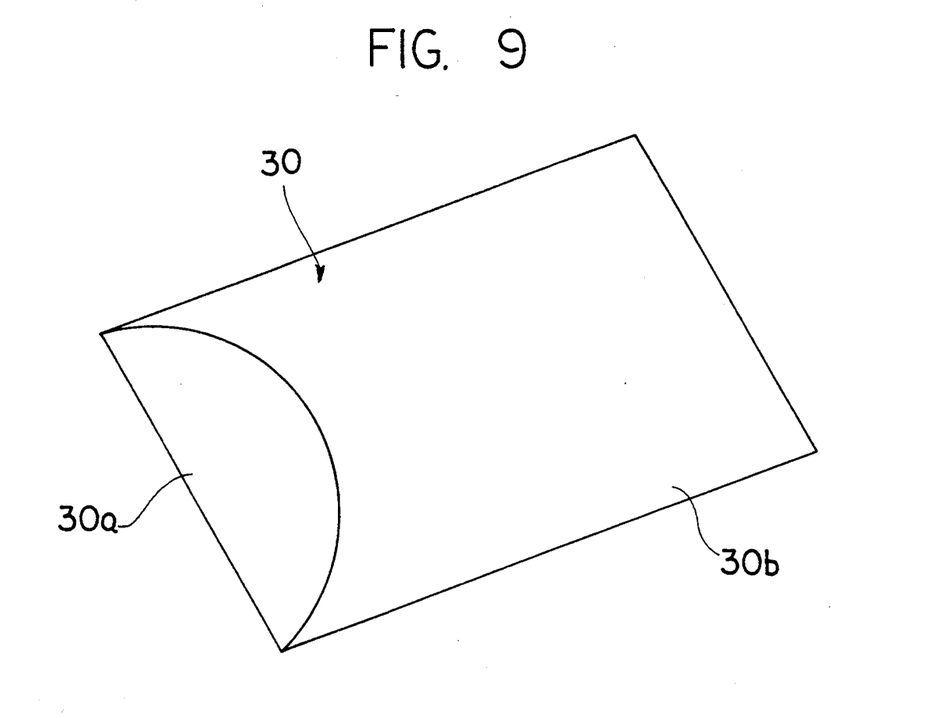
FIG. 9 is a perspective view of net-mouth expanding body.
Figure 10:
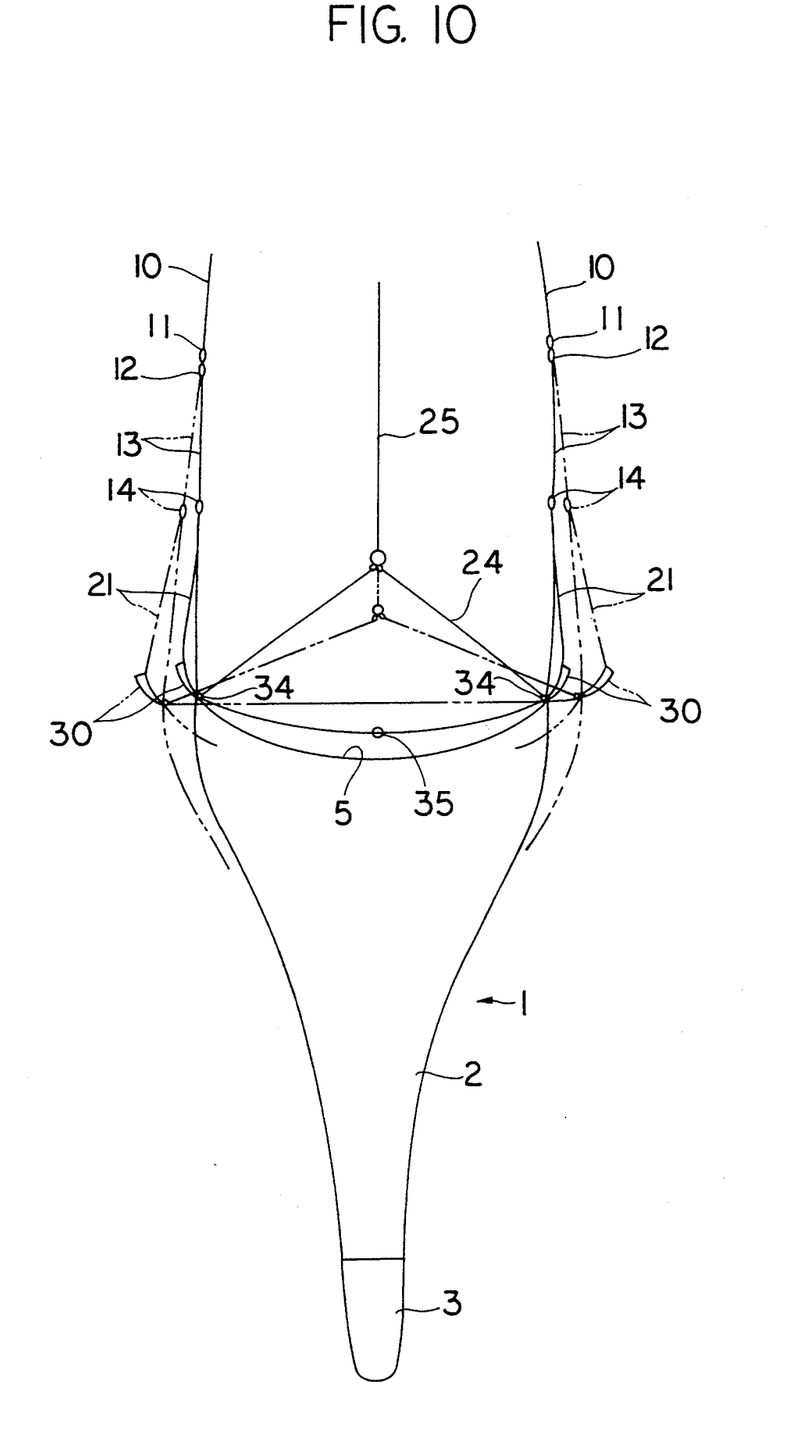
FIG. 10 is a plan view of trawl fishing gear shown in FIG. 6 in its using state.
Figure 11:
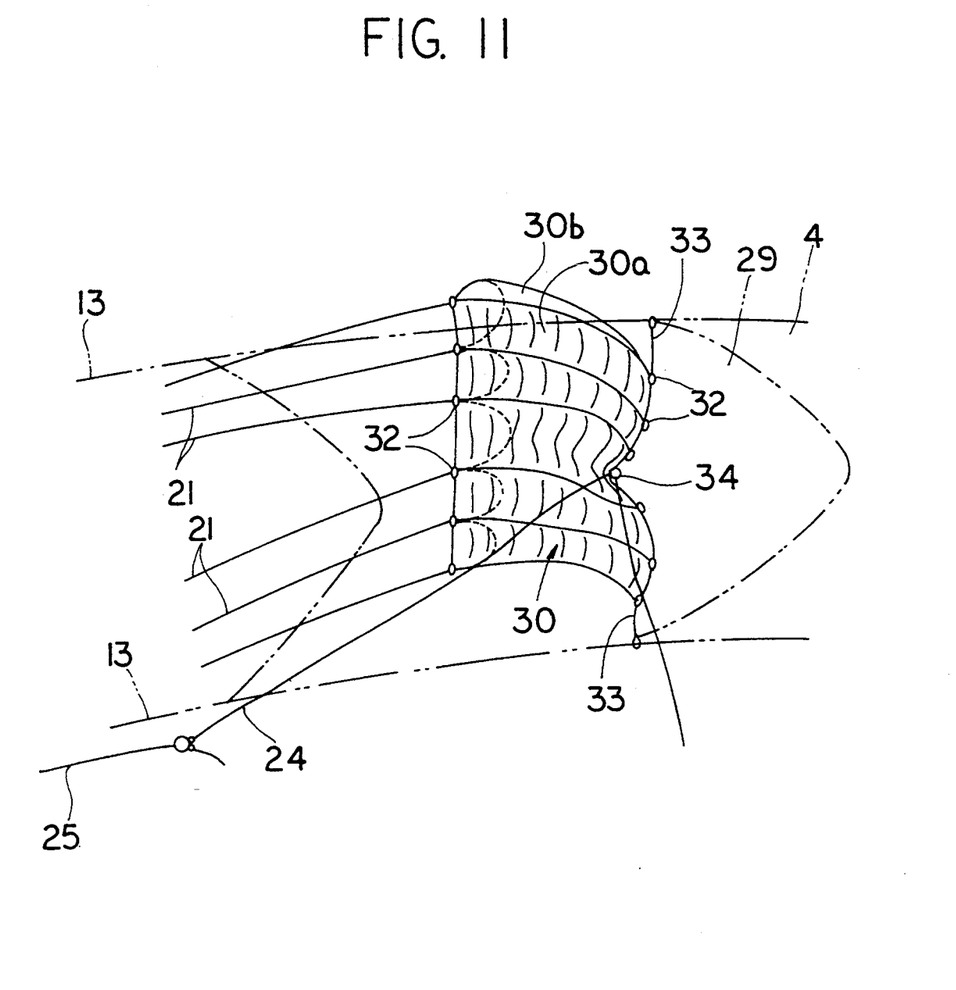
FIG. 11 is a perspective view of a variant of net-mouth expanding body.

In this embodiment, floating nets 29 similar to rope net as shown in FIG. 8 are attached to trawl net body 2 near the front edge of wings 4 and the downstream ends of respective tough-warp 13, 13. Five pieces of bag-like net-mouth expanding body 30, 30 are juxtaposed outside of respective floating nets 29 along the middle portion of upstream edge of respective wings 4. Each net-mouth expanding body 30 consists of horizontal rectangular inner cloth piece 30a and approximately fan-shaped outer cloth piece 30b having the same length of its downstream edge as that of cloth piece 30a and the upstream edge than that of cloth piece 30a, said cloth pieces 30a, 30b being connected with each other at respective side edges and downstream edges and showing an opening on the upstream ends thereby to form a bag. Further, said net-mouth expanding body 30 has each through-holes (not shown) for exhausting a predetermined volume of water from the upstream edge to downstream edge. Connecting ropes 31 for connecting the upstream edge and the downstream edge of said net-mouth expanding bodies 30, 30 are connected thereto through swivels 32, while the upper and lower ends of said downstream edge are connected to the corresponding upper and lower ends of upstream edge of respective wings 4 by means of connecting wires 33, 33. The swivels 32 fitted at the upstream edge of respective net-mouth expanding bodies 30, 30 are connected to respective swivels 14 provided at the middle of tough-warp 13, 13, through connecting wires 21, 21. A ring 34 which serves as variable action point of net-mouth expanding body assembly is attached to the middle portion of downstream edge of the middle net-mouth expanding body 30 so as to be located at the inner side of floating net 29. At the downstream end of lifting rope 25 for adjusting the opening of net-mouth 5, there are attached both ends of a tightening rope 24 which is inserted through respective rings 34, 34. A through-float 35 is provided at the middle point of tightening rope 24 between right and left net-mouth expanding bodies 30, 30. The other components of this structure are the same as those of the first embodiment.

The operation of the second embodiment will be descried hereunder.

Since this embodiment uses no cumbersome and heavy otter board, the operations of laying out and lifting up trawl net 1 are very safe and easy. Further, since the second embodiment has no metallic bent frame 17, its handling becomes easier.

When trawl net 1 has been laid out in water, net-mouth expanding bodies 30, 30 receiving each water flow are separated from each other due to the outer component of applied force, together with the side portions of trawl net 1, i.e. wings 4, thereby to enlarge the opening of net-mouth 5. Since each net-mouth expanding body 30 bag-like form, the expanding operating of net-mouth 5 can be carried out more rapidly. More specifically, immediately after trawl net 1 has been laid out into water, water flows into each net-mouth expanding body 30 between its inner cloth piece 30a and outer cloth piece 30b thereby to expand the latter cloth piece 30b, thus generating net-mouth expanding force, so net-mouth 5 of trawl net 1 is rapidly opened. Thus, trawl net 1 according to this embodiment can be more rapidly expanded up to the operating state. The water flowing between inner cloth piece 30a and outer cloth piece 30b flows out through through-holes in these cloth pieces and gaps at downstream edge of net-mouth expanding body 30.

In this embodiment, the total of the horizontal length of each net-mouth expanding body 30 and that of connecting wire 20 is larger than the length between swivel 14 and the upstream end of corresponding wing 4. Consequently, when lifting rope 25 is reeled out so as to loosen its tightening ropes 24 at the initial step, a triangle is formed by tough-warp 13, connecting wire 21 and inner cloth piece 30a of net-mouth expanding body 30. In this state, the net-mouth expanding forces applied by outer force on these net-mouth expanding bodies 30, 30 are balanced.

Readjusting of the opening of net-mouth 5 starting from this balanced state is very easily carried out by winding up lifting rope 25 on board. As shown by the chain lines of FIG. 10 and FIG. 11, when lifting rope 25 has been wound up, tightening ropes 24 pull up respective rings 34 of respective net-mouth expanding body 30 on upstream side, thereby to deform each net-mouth expanding body 30 so as to increase the angle and surface area thereof with respect to its initial state. This increases the net-mouth expanding force of each net-mouth expanding body 30 thereby to enlarge the opening of respective net-mouth 5. Accordingly, by readjusting the length of lifting rope 25 thereby to vary the angle of each net-mouth expanding body 30 against water flow as shown by chain line in FIG. 10 from the initial state to the final state of largest net-mouth expanding force, the opening of net-mouth 5 of trawl net 1 can be freely adjusted.

Figure 12:
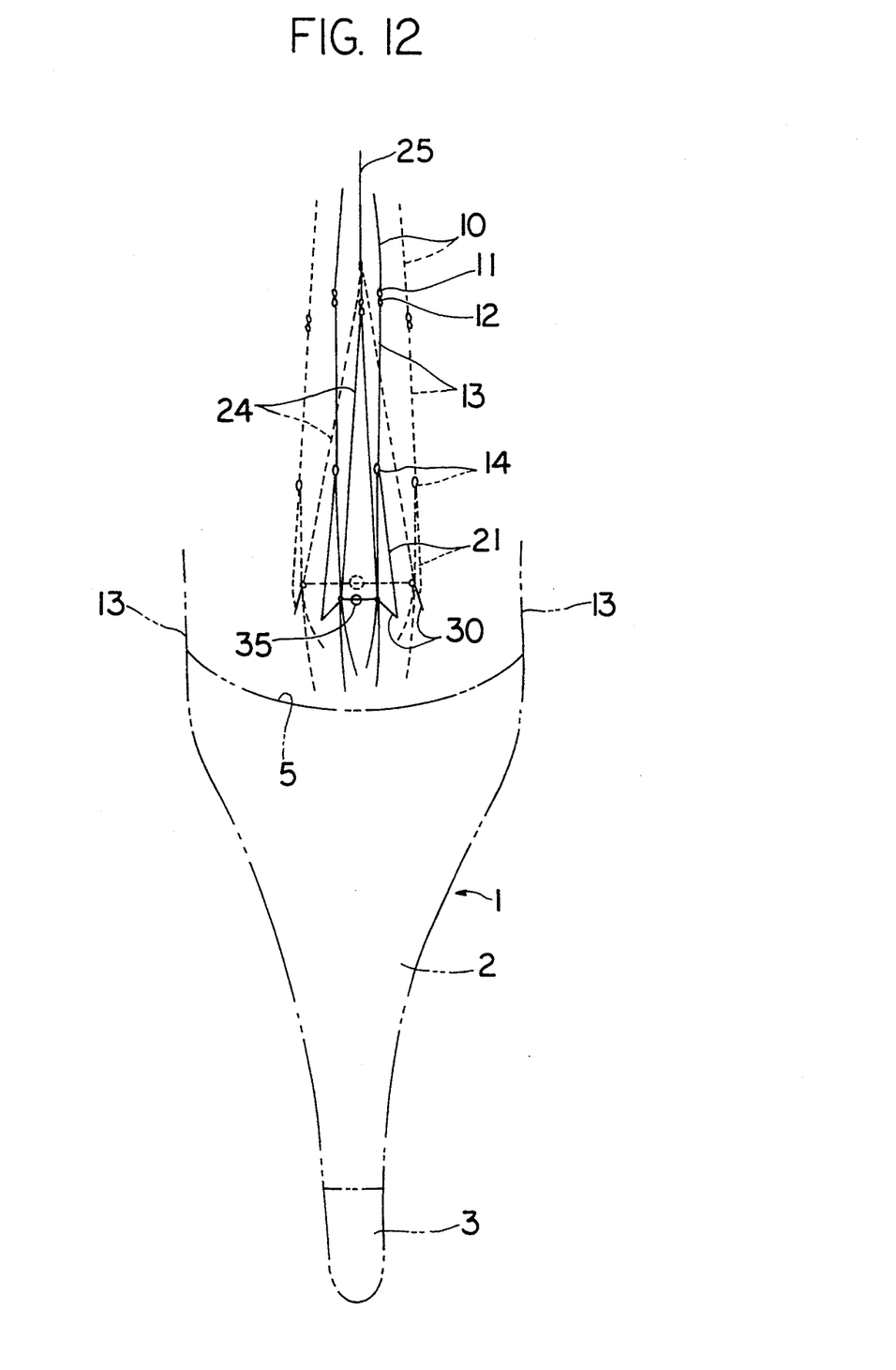
FIG. 12 is a plan view of trawl fishing gear shown in FIG. 6 in its another using state.

When net-mouth 5 of trawl net 1 is to be closed, lifting rope 25 is further wound up as shown in FIG. 12 thereby to reverse the upper end and the lower end of each net-mouth expanding body 30 and to cause the direction of force applied to each net-mouth expanding body 30 to change into net-mouth closing direction. Thus net-mouth 5 of trawl net 1 will be gradually closed. When the inner surface of each net-mouth expanding body 30 is turned to cross water flow as shown by dashed line of the same figure, the net-mouth expanding force of net-mouth expanding body 30 will be lost, so that net-mouth 5 of trawl net 1 will be gradually closed. Further, as shown by chain line of the same figure, when each net-mouth expanding body 30 is released in its free state, it advances in the same direction as water flow without any surface area against water flow, thereby to close net-mouth 5 of trawl net 1 in the same manner as in the first embodiment. Such a towing of trawl net 1 with minimum resistance against water flow allows for rapid shift of trawler with decrease of fuel cost.

Further, the above described net-mouth expanding bodies 30, 30 are formed such that water flow between cloth pieces 30a, 30b is exhausted on downstream side. But, the net-mouth expanding body 30 may be formed as a bag which does not exhaust water flow, thereby to maintain each net-mouth expanding body 30 in its expanded state for the purpose of increasing its net-mouth expanding force. Each net-mouth expanding body may be formed using a single sheet of cloth piece.

Figure 13:
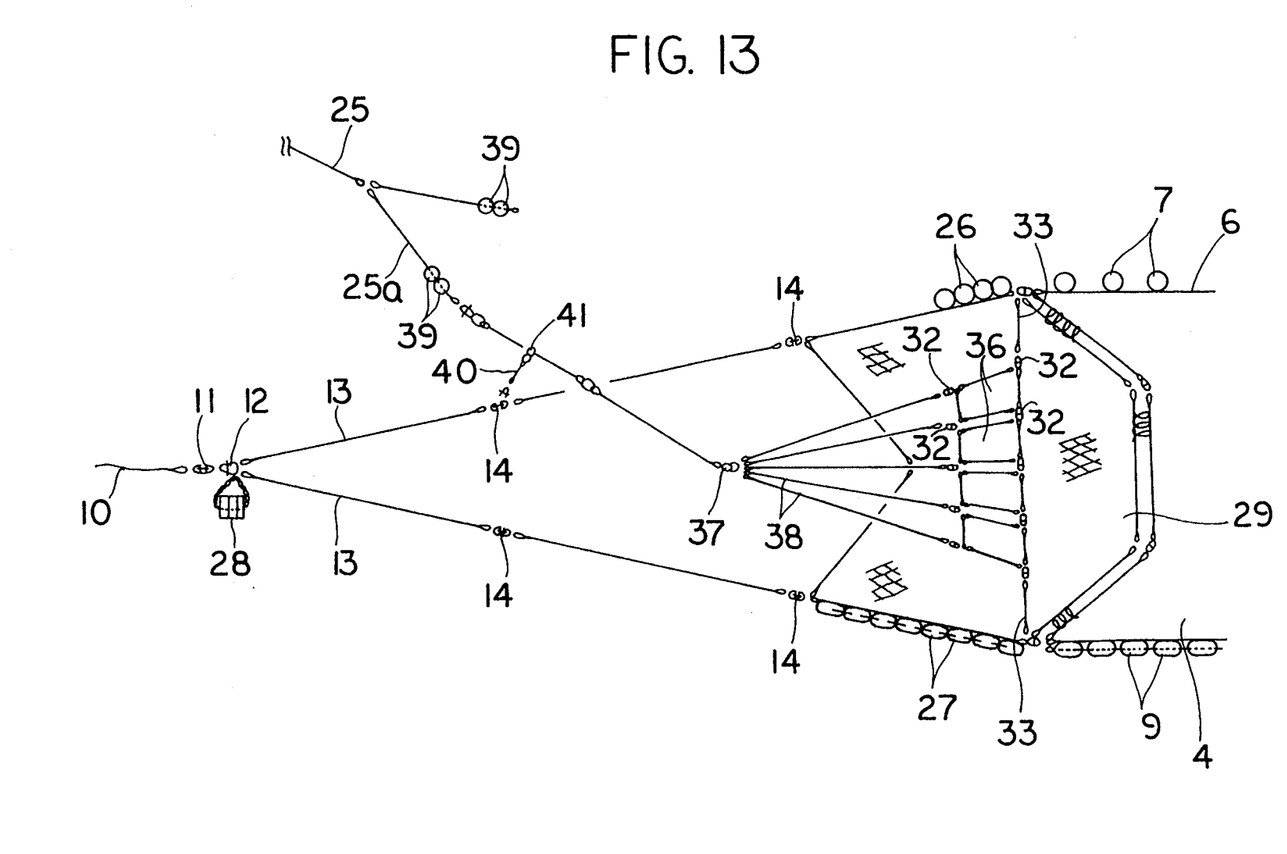
FIG. 13 is a view similar to FIG. 2 of the third embodiment of trawl fishing gear according to the invention.
Figure 14:
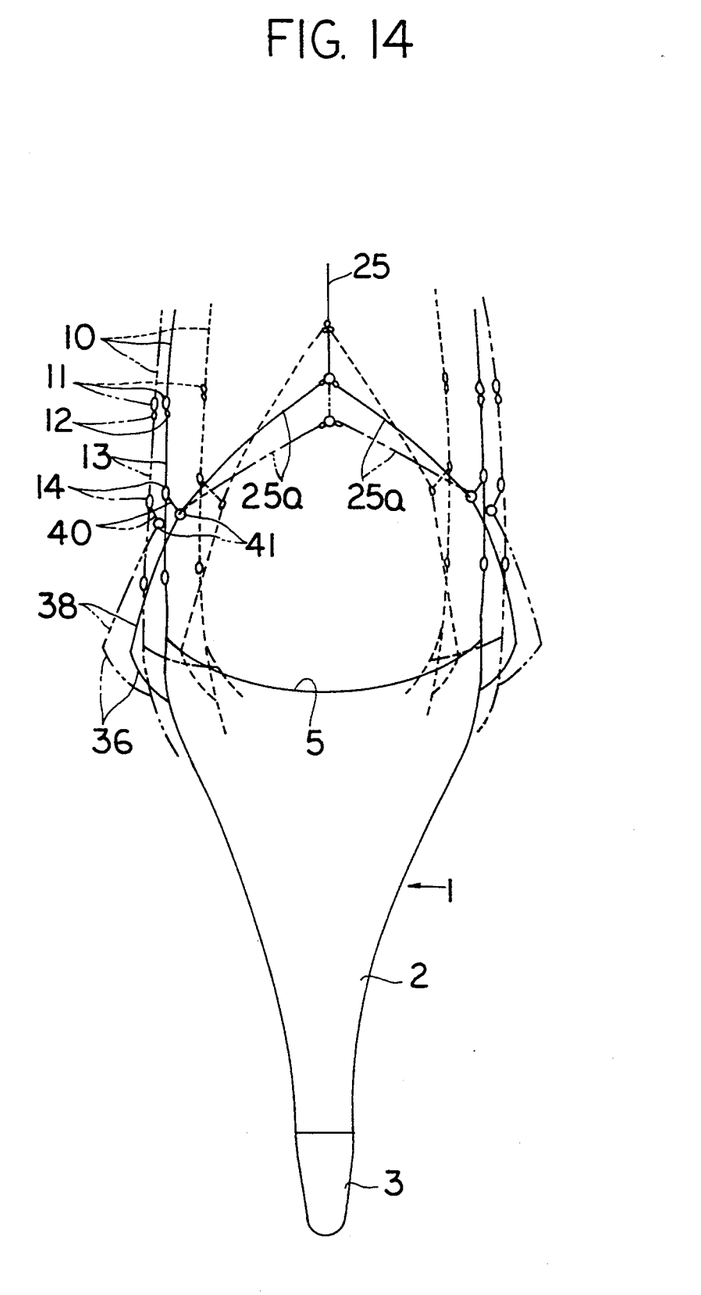
FIG. 14 is a plan view of the trawl fishing gear shown in FIG. 13 in its using state.

The third embodiment of the invention applied to trawl net 1 for bottom fishing is shown in FIG. 13 and FIG. 14. The same components as in the preceding embodiments are designated with the same numbers.

This embodiment is also constructed so as to vary angle and surface area of net-mouth expanding body against water flow thereby to adjust the opening of net-mouth 5 of trawl net 1.

A rope-net like floating net 29 is attached between the upstream edge of corresponding wing 4 and the downstream end of corresponding tough-warp 13. Four sheets of rectangular canvas-made net-mouth expanding bodies 36, 36 are arranged in vertical direction on outer side of corresponding floating nets 29. Swivels 32 are connected substantially integrally to upstream edge and downstream edge of each net-mouth expanding body 36. The upper most and lower most net-mouth expanding bodies 36, 36 have their downstream edges connected to corresponding upper and lower edges of corresponding wings 4 by means of connecting wires 33, 33. The upstream portion of each net-mouth expanding body 36 can swing about the downstream edge thereof. The upstream swivels 32 which serve as variable action points are connected to respective swivels 37 attached to the downstream end of respevtive ropes 25a forming the fork branches of lifting rope 25, by means of respective connecting wires 38, 38. Each branch rope 25a has floats 39 for adjusting the floating power attached thereto in the middle portion thereof, and is inserted through ring 41 fixed at the top of binding wire 40 extended from upper lifting rope 13. Other components of this embodiment are substantially the same as those of preceding embodiments.

The operation of this third embodiment is described herein below.

Since this embodiment uses no cumbersome and heavy otter boards, the operations of laying out and lifting up trawl net 1 are very safe and easy.

When trawl net 1 has been laid out in water, net-mouth expanding bodies 30, 30 receiving each water flow are separated from each other due to the outer component of applied force, together with the side portions of trawl net 1, i.e. wings 4, thereby to enlarge the opening of net-mouth 5.

Adjustment of opening of net-mouth 5 can be carried out very easily by regulating the reel-out length of lifting rope 25 on board. More specifically, when lifting rope 25 is reeled out from the state shown by continuous line 25 of FIG. 14, net-mouth expanding bodies 36, 36 on both sides are separated further from the outer side surfaces of trawl net 1 to get larger angle and surface area against water flow and receive more volume of water flow, thereby to enlarge the net-mouth expanding width of net-mouth 5. On the other hand, when lifting rope 25 is pulled up from the state shown by continuous line of FIG. 14, net-mouth expanding bodies 36, 36 are approached further to the outer side surfaces of trawl net 1 to render smaller their angle and surface area against water flow, thereby to decrease the net-mouth expanding width of net-mouth 5.

When lifting rope 25 is loosened as shown by dashed line of FIG. 14 in order to let flow the upstream portion of net-mouth expanding body 36 at more downstream side than the downstream portion thereof, then the force received by each net-mouth expanding body 36 acts in the direction of closing net-mouth 5, thereby to close net-mouth 5 and minimize the water flow resistance of trawl net 1. Further, when lifting rope 25 is further reeled out to let go each net-mouth expanding body 36, this net-mouth expanding body 36 flows in the same direction as water flow with no surface area against water flow thereby to close net-mouth 5 of trawl net 1 just as the preceding embodiments. By towing trawl net 1 with such a minimum resistance against water flow, a high speed shift of trawler and a low fuel cost become possible.

Further, net-mouth expanding body 36 in this embodiment may be formed in a bag-like form as in the second embodiment.

Further, fixing positions of net-mouth expanding bodies 16, 30, 36 on trawl net 1 can be changed to any desired positions near or upstream of the upstream ends of wings 4 corresponding to fishing purposes by means of floating net 15, 19 and connecting ropes. Net-mouth expanding body 30, 36 may have other forms than rectangular form. The trawl fishing gear according to the invention can be applied to the trawl net for middle depth of water.

Since the trawl fishing gear and the trawl-fishing method according to the invention have the construction and effects as described above, the net-mouth expanding force can be freely readjusted by regulating the reeled our length of lifing rope on board thereby to adjust the net-mouth expanding width of net-mouth according to the fishing purposes, so that the flow resistance can be largely decreased by closing net-mouth of trawl net in the case of high speed shift of trawler, with decrease fuel cost and easy handling of trawl fishing gear.

While the present invention has been described with reference to exemplary embodiments thereof, it will be appreciated by those skilled in the art that variations and modifications may be made thereto without departing from the spirit of the inventive concepts disclosed herein. All such variations and modifications are intended to fall within the scope of the claims appended hereto.

What is claim is:

1. Trawl fishing gear having net-mouth expanding bodies at respective predetermined positions near or upstream of upstream ends of respective wing portions of a trawl net and having respective lifting rope connected to said net-mouth expanding bodies so as to apply pulling forces to variable action points thereon for varying the angle and surface area against water flow of said expanding bodies wherein said net-mouth expanding bodies comprise an arrangement of juxtaposed, collapsible kites wherein said kites comprise sheets of flexible, canvas material extended between metallic frames wherein two opposed edges of said canvas material are cramped to said metallic frames and two opposed edges of said canvas material are unsupported.

2. The fishing gear as recited in claim 1 wherein the vertical length of said kites is approximately 1/7 the length of the forward, vertical edge of said net-mouth.

3. Trawl fishing gear having net-mouth expanding bodies at respective fishing gear having net-mouth expanding bodies at respective predetermined positions near or upstream of upstream ends of respective wing portions of a trawl net having respective lifting rope connected to said net-mouth expanding bodies so as to apply pulling forces to variable action points thereon for varying the angle and surface area against water flow of said expanding bodies wherein said net-mouth expanding bodies comprise an arrangement of juxtaposed, collapsible kites wherein said kites comprise horizontally rectangular, bag-like expanding bodies having a closed downstream end and an enlarged open upstream end.

4. Trawl fishing gear having net-mouth expanding bodies at respective predetermined positions near or upstream of upstream ends of respective wing portions of a trawl net having respective lifting rope connected to said net-mouth expanding bodies so as to apply pulling forces to variable action points thereon for varying the angle and surface area against water flow of said expanding bodies wherein said net-mouth expanding bodies comprise an arrangement of juxtaposed, collapsible kites wherein said kites are pivotally attached to a deformable, vertically-extending action point wherein said vertically extending point comprises a vertically extending chain.

5. The fishing gear as recited in claim 4 wherein said kites comprise sheets of flexible, canvas material cramped on opposed edges between two metallic frames, said frames including brackets mounted proximate to and extending from the upstream edge of said metallic frames at one end, and rotatably mounted to said chain at the opposed end.

6. Trawl fishing gear having net-mouth expanding bodies at respective predetermined positions near or upstream of upstream ends of respective wing portions of a trawl net having respective lifting rope connected to said net-mouth expanding bodies so as to apply pulling forces to variable action points thereon for varying the angle and surface area against water flow of said expanding bodies wherein said net-mouth expanding bodies comprise an arrangement of juxtaposed, collapsible kites wherein said kites are pivotally attached to a deformable, vertically-extending action point wherein said kites comprise rectangular, bag-like expanding bodies having a closed downstream end and an enlarged open upstream end, said bag-like expanding bodies pivotally attached at said downstream end to said vertically extending action point.

7. The fishing gear as recited in claim 6 wherein kites are connection along adjacent, horizontal edges.

8. The fishing gear as recited in claim 7 wherein said pivoting means is rotatably attached proximate the upstream edge of said bag-like expanding bodies.

9. The fishing gear as recited in claim 5 wherein said pivoting means is rotatably attached proximate the downstream edge of each of said metallic frames.

10. Fishing gear for trawling behind a vessel, comprising:
1) an elongate net-body having a closed cod end at the downstream end of said net-body and an expandable and contractible net-mouth at the upstream end of said net-body;
2) elongate warps mounted to opposed sides of said net-mouth for trawling said net-body through a body of water;
3) net-mouth expanding bodies mounted to opposed sides of said net-mouth for expanding and contracting said net-mouth, said net-mouth bodies being deformable to change the surface area of said bodies and pivotable about action points relative to said net-mouth to change the angle of attack of said bodies,
  a) said net-mouth bodies comprise an ordered arrangement of juxtaposed, collapsible kites, said kites comprising:
    i) sheets of flexible, canvas material extended between metallic frames;
    ii) two opposed edges of said canvas material being cramped to said metallic frames and two opposed edges of said canvas material are unsupported;
    iii) the vertical length of said kites being approximately 1/7 the length of the forward, vertical edge of said net-mouth;
  b) adjacent collapsible kites being interconnected along a common edge;
  c) said kites being pivotally mounted to a deformable, vertically extending action point, said action point comprising:
    i) a vertically extending chain;
    ii) said metallic frames including brackets mounted proximate to and extending from the upstream edge of said metallic frames at one end, and rotatably mounted to said chain at the opposed end;
4) means for pivoting said net-mouth expanding bodies about said action points from the vessel,
  i) said pivoting means being rotatably mounted proximate the downstream edge of said metallic frames.

11. Fishing gear for trawling behind a vessel, comprising:
1) an elongate net-body having a closed cod end at the downstream end of said net-body and an expandable and contractible net-mouth at the upstream end of said net-body;
2) elongate warps mounted to opposed sides of said net-mouth for trawling said net-body through a body of water;
3) net-mouth expanding bodies mounted to opposed sides of said net-mouth for expanding and contracting said net-mouth, said net-mouth bodies being deformable to change the surface area of said bodies and pivotable about action points relative to said net-mouth to change the angle of attack of said bodies, a) said net-mouth bodies comprise an ordered arrangement of juxtaposed, collapsible kites, said kites comprising:
   i) horizontally rectangular, bag-like expanding bodies having a closed downstream end and an enlarged open upstream end.
b) adjacent collapsible kites being interconnected along a common edge;
c) said kites being pivotally mounted to a deformable, vertically extending action point;
   i) said bag-like expanding bodies being pivotally connected at said downstream end to said vertically extending action point;
   ii) said bag-like expanding bodies interconnected along vertically adjacent, horizontal edges;
4) means for pivoting said net-mouth expanding bodies about said action points from the vessel,
   i) said pivoting means being rotatably mounted proximate the upstream edge of said bag-like expanding bodies.

* * * * *